W. R. PERCE.
CUFF PIN.
APPLICATION FILED FEB. 8, 1912.
1,047,441.
Patented Dec. 17, 1912.
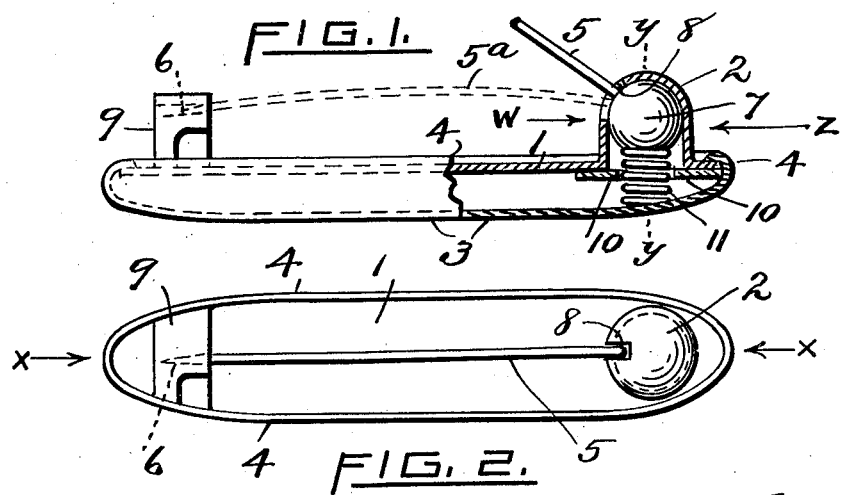
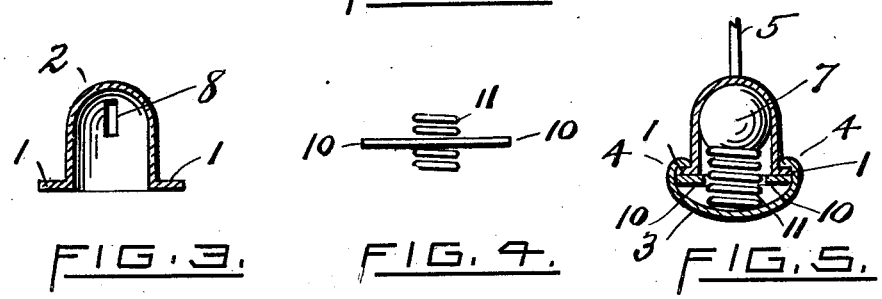
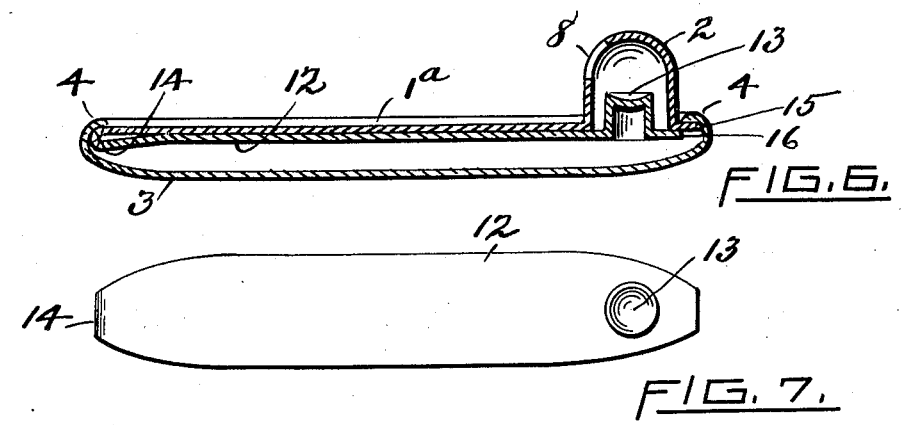
WITNESSES:
Arthur P. Johnson
Annie E. Perce
INVENTOR:
Warren R. Perce

UNITED STATES PATENT OFFICE.

WARREN R. PERCE, OF PROVIDENCE, RHODE ISLAND.

CUFF-PIN.

1,047,441.  Specification of Letters Patent. Patented Dec. 17, 1912.

Application filed February 8, 1912. Serial No. 676,424.

*To all whom it may concern:*

Be it known that I, WARREN R. PERCE, a citizen of the United States, residing at Providence, in the county of Providence and State of Rhode Island, have invented certain new and useful Improvements in Cuff-Pins, of which the following is a specification, reference being had therein to the accompanying drawings.

My invention relates to cuff pins and similar articles of wear and adornment and the construction thereof; and more specifically to the combination of a shell or body-portion having a slotted, hollow, hemispherical joint-member within which a pin stem and the spherical head thereof are mounted, which head is pressed by a spring into proper contact with the interior surface of the joint-member, the pin stem extending loosely through the slot of said member.

In the accompanying drawing like reference numerals indicate like parts.

Figure 1 is a view of my improved cuff pin, as seen partly in side elevation and partly in section on line $x$ $x$ of Fig. 2. Fig. 2 is a top plan view of said cuff pin. Fig. 3 is a view of the pin joint, as seen partly in elevation and partly in section on line $y$ $y$ of Fig. 1, in the direction of the arrow $z$ of Fig. 1. Fig. 4 is a view in elevation of the spiral-spring seat and the plate therefor, used in my said cuff pin. Fig. 5 is a view, as seen partly in elevation and partly in section on line $y$ $y$ and in the direction of the arrow $w$ of Fig. 1, the pin stem and its spherical head and also the spiral-spring seat being shown in elevation. Fig. 6 is a view of a modified form of my said invention, the lining plate, pin joint, seat to support the spherical head of the pin stem, and a spring plate, integral with said seat, all being shown in section on line $x$ $x$ of Fig. 2. Fig. 7 is a top plan view of said modified form showing the spring plate and the said integral seat thereof.

In the drawings 1 represents a piece of sheet metal constituting a back plate or lining plate, and 2 is a pin joint integral therewith. An ornamental front or shell 3 comprises a concavo-convex case or body-portion, into which the lining plate 2 fits, and the peripheral edge of the shell 3 is bent over upon the lining plate 1, as illustrated at 4 in Figs. 1, 2 and 5.

A pin stem 5 of steel, or other tempered metal, has a pointed end 6. Its opposite end is inserted in a spherical or globular head 7, or made integral therewith. This head 7 may be made of metal, glass, rubber, celluloid, wood, or any other suitable material.

The head 7 and pin stem 5 may be made of one piece of metal, or the head 7 may be diametrically bored, or a socket may be formed therein. When the head 7 is thus made as a separate piece, the blunt end of the pin stem is inserted into such bore or socket and is there secured in position.

The pin joint member 2 is hollow and its outer end is made hemispherical and its inner end tubular, as represented in Figs. 1, 3, 5 and 6, so that the head 7 of the pin 5 is inclosed therein and is capable of a limited oscillation. The pin joint 2 has a rectangular slot 8 therein, about 30° in extent, shown in Figs. 1, 2, 3 and 6. The pin 5 extends loosely through said slot and is confined thereby to a linear oscillation from the position shown in Fig. 1, in solid lines to the position indicated in said figure by the dotted lines 5$^a$. The point 6 of the pin tongue is engaged in the pin catch 9, which is at that end of the lining plate 1 opposite to the pin joint 2, when the pin tongue is sprung thereinto, as represented by the dotted lines 5$^a$.

A metallic plate 10, designated as a spring-supporting plate, is preferably oblong in shape and has a central opening. A spiral spring 11 is engaged with the spring plate 10 in the opening thereof, as seen in Figs. 1, 4 and 5. The spring 11 at its upper open end receives the lower portion of the head 7 of the pin, as shown in Figs. 1 and 5, and serves to press the upper portion of the head 7 into snug contact with the inner surface of the hemispherical end of the pin joint 2, and to hold it in such contact at all times. The rolled-over edge 4 of the shell or body 3 confines and secures in position both the lining plate 1 and the spring plate 10 as seen in Figs. 1 and 5.

Instead of having a spiral spring 11 to press the head 7 to the hemispherical inner surface of the pin joint as above explained, a spring plate 12 may be used, as represented in Figs. 6 and 7. The spring plate 12 has a seat 13 formed near the end thereof, and on the transverse line 14 is bent closely into contact with the lining plate 1ª, with which it is integral, and at this bent end the fold of the plates 1ª and 12 is secured by the turned or rolled edge 4 of the shell or body 3, adjacent thereto. At the opposite end the edge 15 of the lining plate 1ª is held by the turned or rolled edge 4 of the adjacent portion of the shell or body 3, but the end 16 and the longitudinal edges of the plate 12 are free and are not held by said turned or rolled edge, and therefore yields to pressure, so that the head 7 of the pin 5 is continually and normally forced upwardly into its proper position in the pin joint 2. The spring plate 12 has its folded edge 14 for a fulcrum and gets its resilience from the temper of the metal of which it is made. The comparatively great length of the spring plate 12 makes its spring action gentle, but sufficiently effective.

It is obvious that for either of the spring constructions specified and illustrated as aforesaid, any other equivalent spring can perform this same function which is within the scope of the appended claim.

I claim as a novel and useful invention and desire to secure by Letters Patent:

In a cuff pin or similar article, the combination of a back plate having near one end thereof a hollow, open-bottomed joint-member, which is tubular in shape and has a dome-shaped outer end and is provided with a longitudinal slot; a pin stem passing loosely through said slot; a spherical head at the blunt end of the pin stem, fitting slidably in said joint-member; a spring adapted to receive and yieldingly to support the said spherical head of the pin and to maintain a contact of said pin head including the portions contiguous to the pin stem with the inner surface of the dome-shaped portions of said joint member; and means for holding the spring in operative position.

In testimony whereof I affix my signature in presence of two witnesses.

WARREN R. PERCE.

Witnesses:
ARTHUR P. JOHNSON,
ANNIE E. PERCE.

---

Copies of this patent may be obtained for five cents each, by addressing the "Commissioner of Patents, Washington, D. C."